United States Patent
Fox et al.

(10) Patent No.: US 7,725,735 B2
(45) Date of Patent: May 25, 2010

(54) SOURCE CODE MANAGEMENT METHOD FOR MALICIOUS CODE DETECTION

(75) Inventors: James Edward Fox, Apex, NC (US); Erich Shannon Magee, Cary, NC (US); Lisa Hayes Magee, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1102 days.

(21) Appl. No.: 11/093,548

(22) Filed: Mar. 29, 2005

(65) Prior Publication Data
US 2006/0230289 A1    Oct. 12, 2006

(51) Int. Cl.
G06F 11/30     (2006.01)
G06F 11/00     (2006.01)

(52) U.S. Cl. .................. 713/188; 713/187; 726/22; 726/24

(58) Field of Classification Search .......... 713/188, 713/187; 726/22, 24
See application file for complete search history.

(56) References Cited

U.S. PATENT DOCUMENTS

| | | | |
|---|---|---|---|
| 5,542,045 A | 7/1996 | Levine | 395/186 |
| 5,893,118 A | 4/1999 | Sonderegger | |
| 6,044,467 A | 3/2000 | Gong | |
| 6,192,476 B1 | 2/2001 | Gong | |
| 6,343,376 B1 | 1/2002 | Saxe et al. | 717/9 |
| 6,728,886 B1 * | 4/2004 | Ji et al. | 726/24 |
| 6,742,006 B2 | 5/2004 | Raduchel et al. | 707/200 |
| 6,748,534 B1 * | 6/2004 | Gryaznov et al. | 713/188 |
| 6,792,543 B2 | 9/2004 | Pak et al. | |
| 7,069,589 B2 | 6/2006 | Schmall et al. | |
| 7,080,408 B1 * | 7/2006 | Pak et al. | 726/24 |
| 7,093,239 B1 * | 8/2006 | van der Made | 717/135 |
| 7,131,036 B2 * | 10/2006 | Wray et al. | 714/38 |
| 7,346,897 B2 | 3/2008 | Vargas | |
| 7,398,553 B1 | 7/2008 | Li | |
| 2002/0116635 A1 | 8/2002 | Sheymov | 713/200 |
| 2002/0174137 A1 | 11/2002 | Wolff et al. | |

(Continued)

OTHER PUBLICATIONS

Engler et al., "Bugs as Deviant Behavior: A General Approach to Inferring Errors in Systems Code", Computer Systems Laboratory, Stanford University, published in SOSP 2001, 2001.

(Continued)

*Primary Examiner*—Nasser Moazzami
*Assistant Examiner*—Mohammad W Reza
(74) *Attorney, Agent, or Firm*—Patents on Demand, P.A.; Scott M. Garrett

(57) ABSTRACT

A system and method enhancing source code management with existing virus detection methods in a library management system to detect potentially malicious code. Malicious code that is introduced into a software product may be detected before the code is able to damage stored data and other software by preventing a product build with the malicious code. Source code received at a code management library system from a set of software developers in a collaborative development environment is moved into a staging area. A determination is made in the staging area as to whether malicious code exists in the source code. If malicious code exists, the library management system does not forward the source code to the software product build and notifies a system administrator of the presence of the malicious code.

20 Claims, 7 Drawing Sheets

U.S. PATENT DOCUMENTS

| | | | |
|---|---|---|---|
| 2003/0159090 A1* | 8/2003 | Wray et al. | 714/38 |
| 2004/0015712 A1 | 1/2004 | Szor | 713/200 |
| 2005/0044400 A1* | 2/2005 | Li et al. | 713/200 |
| 2006/0004810 A1 | 1/2006 | Atkin et al. | |

OTHER PUBLICATIONS

Evans et al., "Improving Security Using Extensible Lightweight Static Analysis", IEEE Software, 2002 IEEE, Jan./Feb. 2002, pp. 42-51.

"Automated Software Inspection A New Approach to Increased Software Quality and Productivity", Reasoning Inc., Technical White Paper, 2003.

Kurowsky et al., "Trusting Software: Malicious Code Analyses", U.S. Army CECOM Software Engineering Center, Fort Monmouth, NJ.

"Why Application Security if the New Business Imperative—and How to Achieve It", Secure Software, Inc., 2004.

"Trust, But Verify: How to Manage Risk in Outsourced Applications", Security Topics White Paper, Ounce Labs, Inc., 2004.

Fox et al., Source Code Classification Method for Malicious Code Detection, Mar. 29, 2005.

Fox et al., Source Code Repair Method for Malicious Code Detection, Mar. 29, 2005.

* cited by examiner

SOURCE CODE MANAGEMENT METHOD FOR MALICIOUS CODE DETECTION

CROSS REFERENCE TO RELATED APPLICATIONS

This application is related to commonly assigned and co-pending U.S. patent application Ser. No. 11/093,059 entitled "SOURCE CODE CLASSIFICATION METHOD FOR MALICIOUS CODE DETECTION"; and U.S. patent application Ser. No. 11/093,476 entitled "SOURCE CODE REPAIR METHOD FOR MALICIOUS CODE DETECTION"; both filed even date herewith and hereby incorporated by reference.

BACKGROUND OF THE INVENTION

1. Technical Field

The present invention relates to network data processing systems and, in particular, to protecting against viruses. Still more particularly, the present invention provides an improved method, apparatus, and program for source code management.

2. Description of Related Art

The computer field in general has been plagued by the introduction of programs known as computer "viruses" or "worms". A computer virus is a section of code that is buried or hidden in another program. Once the program is executed, the code is activated and attaches itself to other programs in the system. Infected programs in turn copy the code to other programs. In this manner, virus code may spread throughout the computing system and, potentially, to other computing systems via network connections. The effect of such viruses can be simple pranks such as causing a message to be displayed on the screen, or more serious such as the destruction of programs and data. Computer worms are destructive programs that replicate themselves throughout a hard disk and/or memory within a computer using up all available disk or memory space. This replication eventually causes the computer system to crash since, eventually, there is no available disk or memory space to store data.

To combat the increasing problem of computer viruses and worms, many computer users employ the use of protection programs to detect data packets that may contain viruses or worms and then eliminate them before the program associated with the data packet may be run. Existing protection programs typically employ pattern matching to identify malicious code. Pattern matching is a process wherein a file is scanned and its code compared against virus patterns stored in its database. If a virus signature is detected in the code, the file is isolated and notification is provided to the user that a virus is present in the scanned file. In this way, infected files may be identified and eliminated before they cause damage to the computer system.

Security of program code is an issue for software developers as well. It is not uncommon for the development of a product to involve the resources of many outside teams of disconnected developers. This sort of collaborative development of potentially untrustworthy contributors, especially in the realm of open source development, leaves an end product exposed to potentially malicious code being inserted into the source code. Source code comprises programming statements and instructions that are written by a programmer. Source code is what a programmer writes, but it is not directly executable by the computer. A developer of a product may introduce destructive code into the source, which may result in significant damage to both stored data and other software.

Therefore, it would be advantageous to have a method for enhancing source code management by using existing virus detection methods in a library management system to identify potentially malicious code in the source code of a software product prior to performing a product build.

BRIEF SUMMARY OF THE INVENTION

The present invention provides a system and method for enhancing source code management by using existing virus detection methods in a library management system to detect potentially malicious code. With the mechanism of the present invention, malicious code that is introduced into a software product may be detected before the code is able to damage stored data and other software by preventing a product build with the destructive code. When source code is received at a code management library system from a set of software developers in a collaborative development environment, the source code is moved into a staging area. A determination is then made as to whether malicious code exists in the source code. If malicious code exists, the library system removes the source code from the software product build and notifies the system administrator of the presence of malicious code.

The mechanism of the present invention also provides a repair mechanism within the code management library system for repairing build code that is infected with malicious code. When a virus pattern is detected in a component of a source code, other components in the source code containing dependencies upon the first component are identified. This identification may be based on rules defined from relationships between the infected component and the other components in the source code. The component and the other components that are identified as having dependencies upon the infected component are retracted from the software product build. The infected component and the other identified components are then replaced with a previous archive of the code build. The software product build of the source code may then be performed.

The mechanism of the present invention also provides a classification mechanism within the source code management system for customizing malicious code searches. This classification mechanism is used to limit the number of searches that are performed on incoming source code, as some malicious code searches may only need to be performed on particular modules, classes, components, etc. of the software product. When a library system is being set up to receive new source code, security classifications are created for the source code. Upon receiving the source code from a software developer, each component in the source code is associated to a security classification. A virus check is then performed on the components in the source code based on the associated security classifications. In this manner, only certain components may need to be checked for certain virus patterns, and other components may be checked for other virus patterns.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
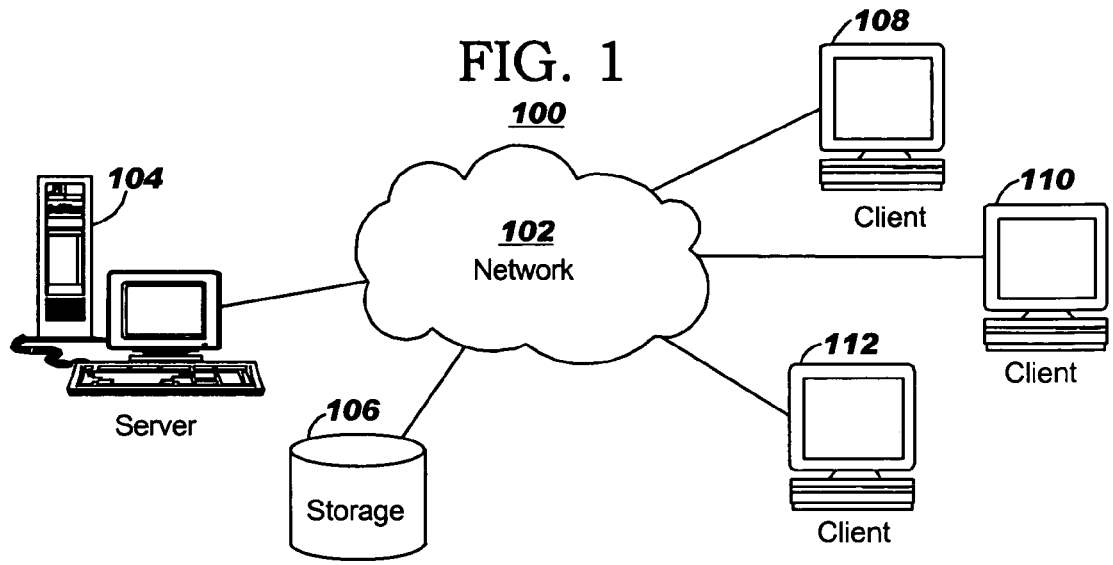
FIG. 1 depicts a pictorial representation of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
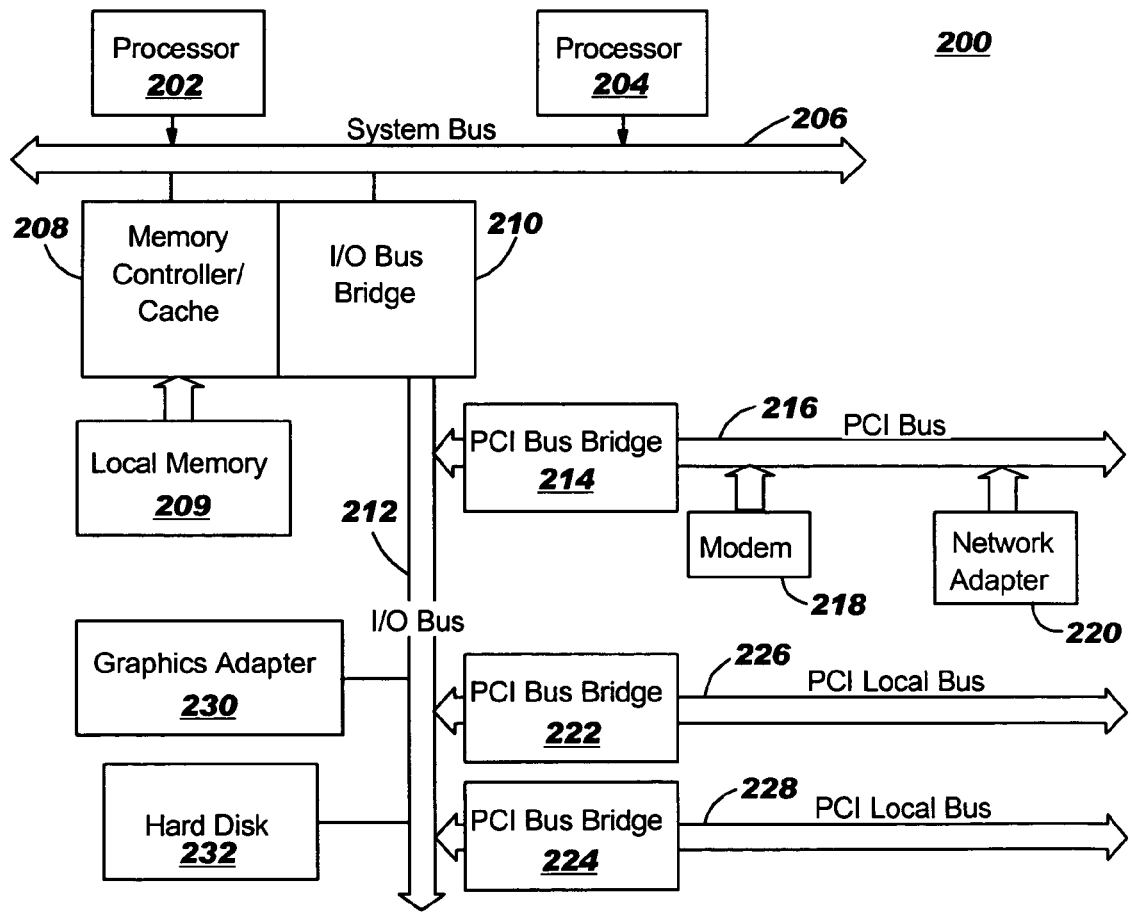
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
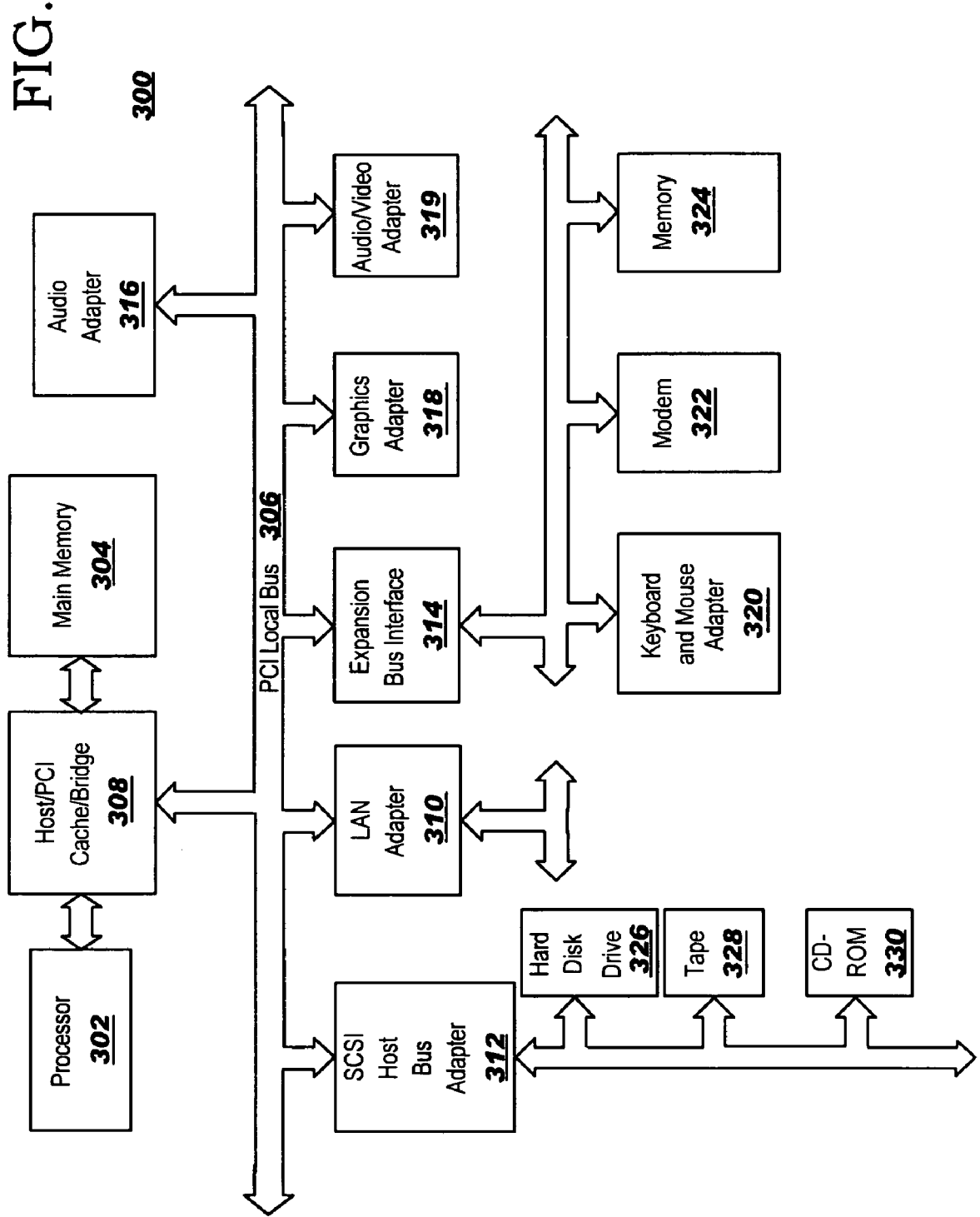
FIG. 3 is a block diagram of a data processing system that may be implemented as a client in accordance with a preferred embodiment of the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java™ may run in conjunction with the operating system and provide calls to the operating system from Java™ programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for using existing virus detection methods in a library management system to detect potentially malicious code. Destructive code that is introduced into the source code of a software product may be detected before a product build is performed in order to prevent damage to stored data and other software. The damage potential may be based on the characteristics of the malicious code. For example, some malicious code may be used to attack important operating system files, leaving the system unstable or unable to re-boot. To combat this problem in the software development environment, the present invention uses known methods of virus detection and incorporates these technologies into a source code management system.

The present invention also provides a security administrator with the ability to update the virus detection methods and virus patterns as new viruses are identified, as well as when an additional function is added to the system that would require checking for new patterns or detection rules.

One known method of detecting computer viruses is through the use of malicious code or virus pattern matching. Virus pattern matching may be implemented as a desktop or server-based application that detects destructive code present in other client or server-based applications. Typically, virus pattern matching comprises using a signature file to identify potentially malicious code, wherein the signature file stores a list of known virus signature patterns. A scan engine may be used to scan a file and compare the code in the file against the content of the signature file. This comparison is performed to determine whether the file code contains a unique string of bits or binary pattern matching a pattern present in the signature file. If the scan engine identifies a matching pattern, the file is deemed to be infected and execution of the file is stopped. To assist in improving the accuracy of virus detection, the signature file should be updated on a regular basis, as new viruses are potential threats. If the signature file does not contain the pattern of such a new virus, the virus can infect the system.

Another known method of detecting viruses is through the use of virus pattern identification. Virus pattern identification employs a process similar to the pattern matching process described above. However, the pattern identification process may differ and be configurable by application, operating system, and environment. The pattern identification process may also employ application specific rules to validate against. For example, only developer X may be allowed to make changes that touch component Y (e.g., the component controlling access to the system).

The mechanism of the present invention implements virus pattern matching and pattern identification methods within a source code management system. These virus identification methods are used to detect malicious code submitted in the software development environment prior to the code being built into an executable package. A system administrator may define certain patterns of potentially malicious code based on the particular platform development environment, such as, for example, AIX™, Microsoft Windows™, or Java™. When source code is received from a software developer, the code management library system places the source code into a staging area. The staging are holds the source code received from one or more developers to test for malicious code patterns. The code management software library uses the staging area to perform a check of the source code prior to incorporating the incoming source code into the product build. This check is performed using the pre-set patterns of potentially malicious code defined by the system administrator. The source code is compared against the pre-set malicious code patterns to identify if a match exists.

If a malicious pattern match is found, the code management software library may send an alert to a trusted authority so that the suspect code may be reviewed. As the suspect code is in the staging area and not yet incorporated into the product build, the suspect code also may automatically be isolated as a result of the pattern match. Consequently, the product build is delayed. If a malicious pattern match is not found, the source code is sent to the build machine to build an executable software package.

With regard to code containing dependencies upon the suspect code, only code within the current change set is subject to retraction. Thus, code that is dependent upon the suspect code but is already within the library will not be affected.

The mechanism of the present invention also provides a classification mechanism within the source code management system for customizing malicious code searches. This classification mechanism is used to limit the number of searches that are performed on incoming source code, as some malicious code searches may only need to be performed on particular modules, classes, components, etc. of the software product. By limiting the number of searches to be performed, the classification mechanism of the present invention may improve the performance of the source code virus detection.

Furthermore, the mechanism of the present invention provides a repair mechanism within the code management library system for repairing build code that is infected with malicious code. In some instances, malicious code may slip through to the product build. This situation may occur if the pattern matching files that are compared against incoming code are not updated regularly. If malicious code is present in a product build, an autonomic configurable function in the repair mechanism of the present invention "repairs" the infected build code by reverting to a previous archive of the code build. For example, the repair mechanism may access a configuration management tool in the library system that retains versions of individual files and configurations of larger software entities such as product releases to obtain a previous version or file. The repair mechanism may autonomically rollback to a previous build regardless of where the offending code is located. The repair mechanism may also autonomically obtain the previous file containing the offending code from the configuration management tool and then rebuild the entire code. The actions taken by the repair mechanism are flexible, as they may depend upon the library administrator rules and may make use of existing functions.

Figure 4:
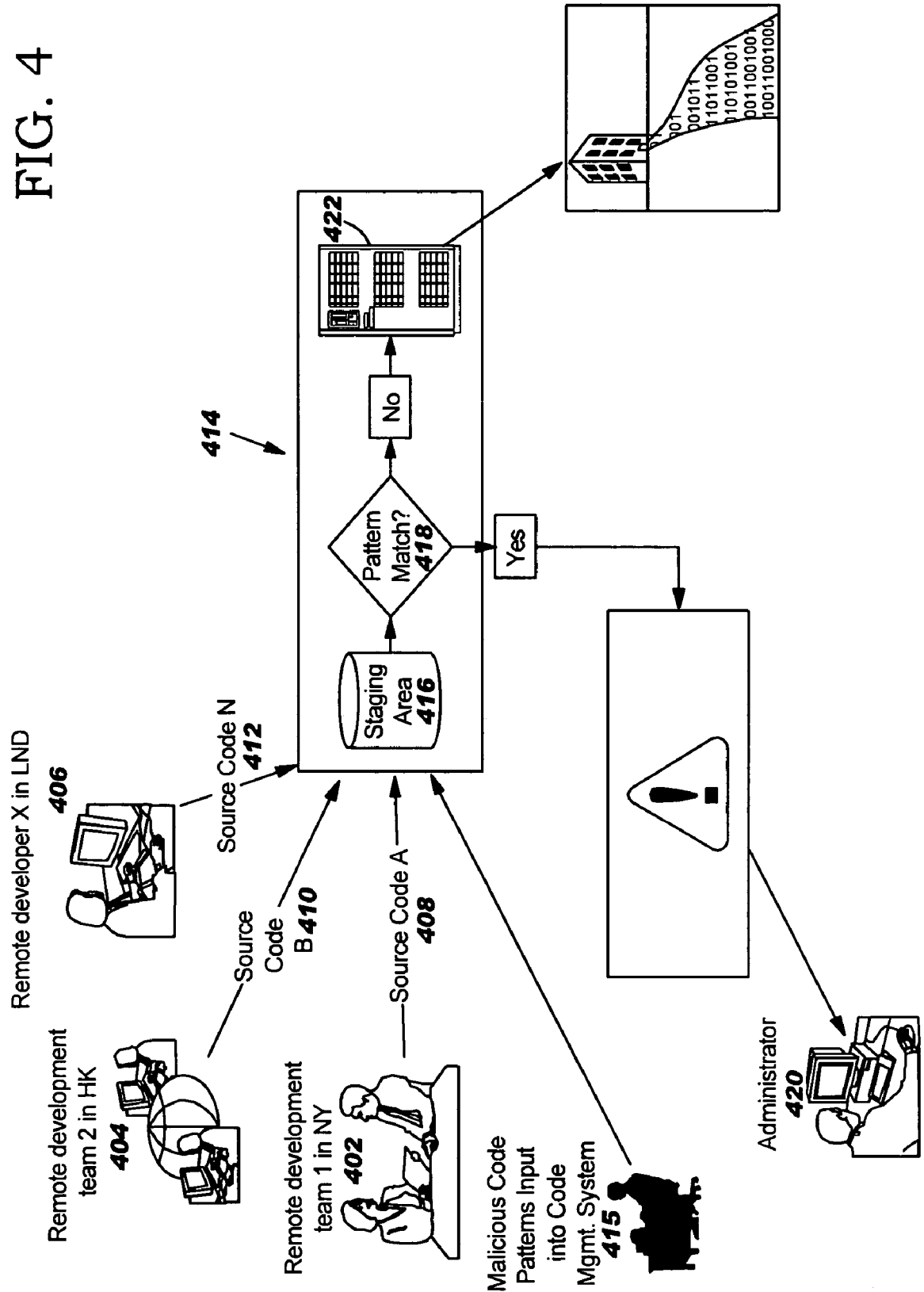
FIG. 4 is a block diagram illustrating an overview of the process used for detecting malicious code in source code of a software product in accordance with a preferred embodiment of the present invention.

Turning now to FIG. 4, a block diagram illustrating an overview of the process used in detecting destructive code introduced into source code in accordance with a preferred embodiment of the present invention is shown. The process illustrated in FIG. 4 may be implemented in a computer network, such as network data processing system 100 shown in FIG. 1.

various software developers may contribute source code for a software product. In this illustrative example, this set of software developers may include a remote development team 1 in New York (NY) 402, a remote development team 2 in Hong Kong (HK) 404, and a remote developer X in London (LND) 406. Each of these software developers may be implemented as a client machine, such as clients 108, 110, and 112 in FIG. 1. Remote development team 1 in NY 402 contributes source code, such as source code A 408 to code management library system 414. Code management library system 414 may be implemented as a server, such as server 104 in FIG. 1. Similarly, both remote development team 2 in HK 404 contributes source code B 410, and remote developer X in LND 406 contributes source code N 412 to code management library system 414. In addition, a developer may also send malicious code, such as malicious code 415, to code management library system 414.

When source code arrives at the code management library system, the source code is placed within staging area 416 upon arrival. For example, source code A 408, is held in staging area 416 so that this source code may be checked for viruses prior to being integrated into the software build.

In staging area 416, code management library system 414 performs a check based on pre-set patterns of potentially malicious code. This check may be performed in various circumstances including, but not limited to, when there is network access to a hard-coded host (e.g., uploading data), when there is file system access to "sensitive" files (e.g., email program address books, credit card information, etc.), and when there is file system access to "system files". Pattern matching 418 performed may include existing virus pattern matching methods, such as comparing the incoming code against known virus signatures.

Upon detecting a malicious pattern match, code management library system 414 may send an alert to a trusted authority, such as security administrator 420, for code review. Code management library system 414 may automatically quarantine the suspect code as well and thus deny the offending source code. Consequently, the software build is delayed. If the comparison does not result in any matches, the source code is deemed safe. The source code is subsequently sent to build machine 422 to build an executable software package. In a preferred embodiment, the build machine is independent of the code library management system, and the source code is stored on different servers than where the build actually occurs.

Figure 5:
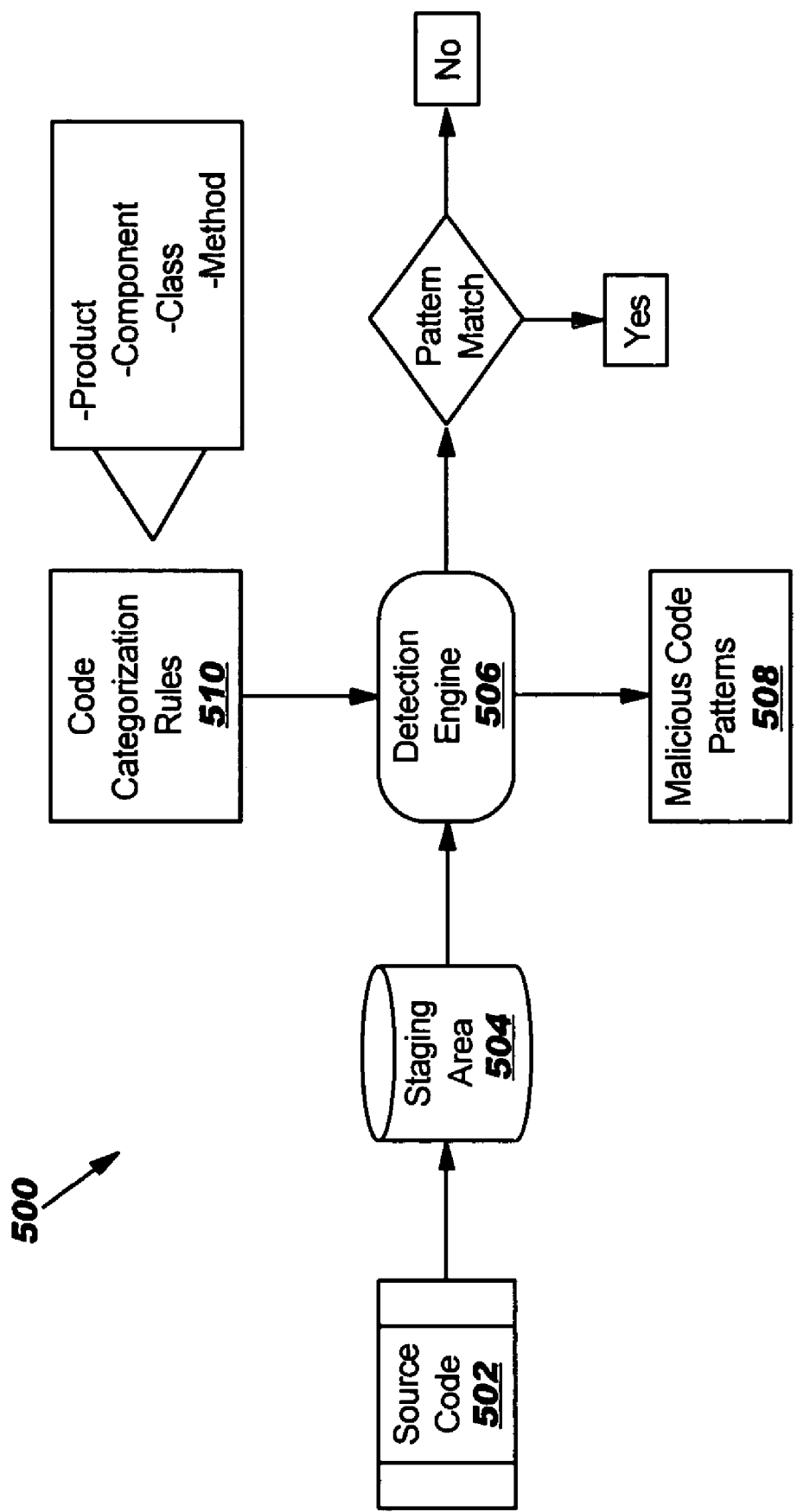
FIG. 5 is a block diagram of exemplary components that may be used in the source code management system to detect malicious code in accordance with a preferred embodiment of the present invention.

FIG. 5 is a block diagram of exemplary components used to detect destructive code in the source code in accordance with a preferred embodiment of the present invention. The components used to implement the present invention are positioned as a front-end to code library management system 500 and are transparent to the library user. Those of ordinary skill in the art will appreciate that the components depicted in FIG. 5 may vary, as the staging area and functional implementations are tightly tied to the library system of choice.

In this illustrative example, source code 502 is placed in staging area 504. Staging area 504 holds source code 502 for testing prior to the code being incorporated into the product build. Once in staging area 504, detection engine 506 may perform a check of source code 502. When performing the virus check, detection engine 506 may use pre-set malicious code patterns 508. The list of patterns may be defined by the system administrator and is compared against source code 502 to identify if a match exists.

In addition, code management library system 500 in FIG. 5 may also incorporate a classification mechanism in accordance with a preferred embodiment of the present invention. In particular, the classification mechanism may be used to customize malicious code searches. As certain types of malicious code searches may only need to be performed on certain modules, classes, components, etc. of the software product, the classification mechanism may comprise code categorization rules 510, which may define the virus pattern check to be performed on a particular component of the code. Customization of searches to be performed on incoming source code allows for limiting the number of searches to be performed, and, as a result, this customization may improve the performance of the source code virus detection described above.

For example, code library systems are built on the component model. A security related code may be defined in a specific security package (com.ibm.someproduct.security) and managed in a code library under a component definition for that package. This provides a natural high source code into product.component.class.method. Code categorization rules 510 may be written by the system administrator at any desired granularity.

The classification mechanism of the present invention may be utilized by detection engine 506 through code categorization rules 510 when the engine is performing the virus check. As code categorization rules 510 contain rules for identifying the circumstances in which the virus checks should be performed, the rules may, for instance, define that a virus check may be performed when certain sensitive or system files are accessed. The rules may also define that certain developers may be allowed to touch certain areas of code, and then within those areas of code, pattern matching would be performed to identify the presence of any pattern matches.

For example, a component of an application may comprise source code that controls access to a system. In this case, the search performed on the incoming source code associated with the component may be customized to search for types of malicious code that would target passwords, creation of user IDs, etc. Thus, instead of having to check all of the incoming source code, the classification method of the present invention enables certain parts of the incoming code to be checked for viruses.

Figure 6:
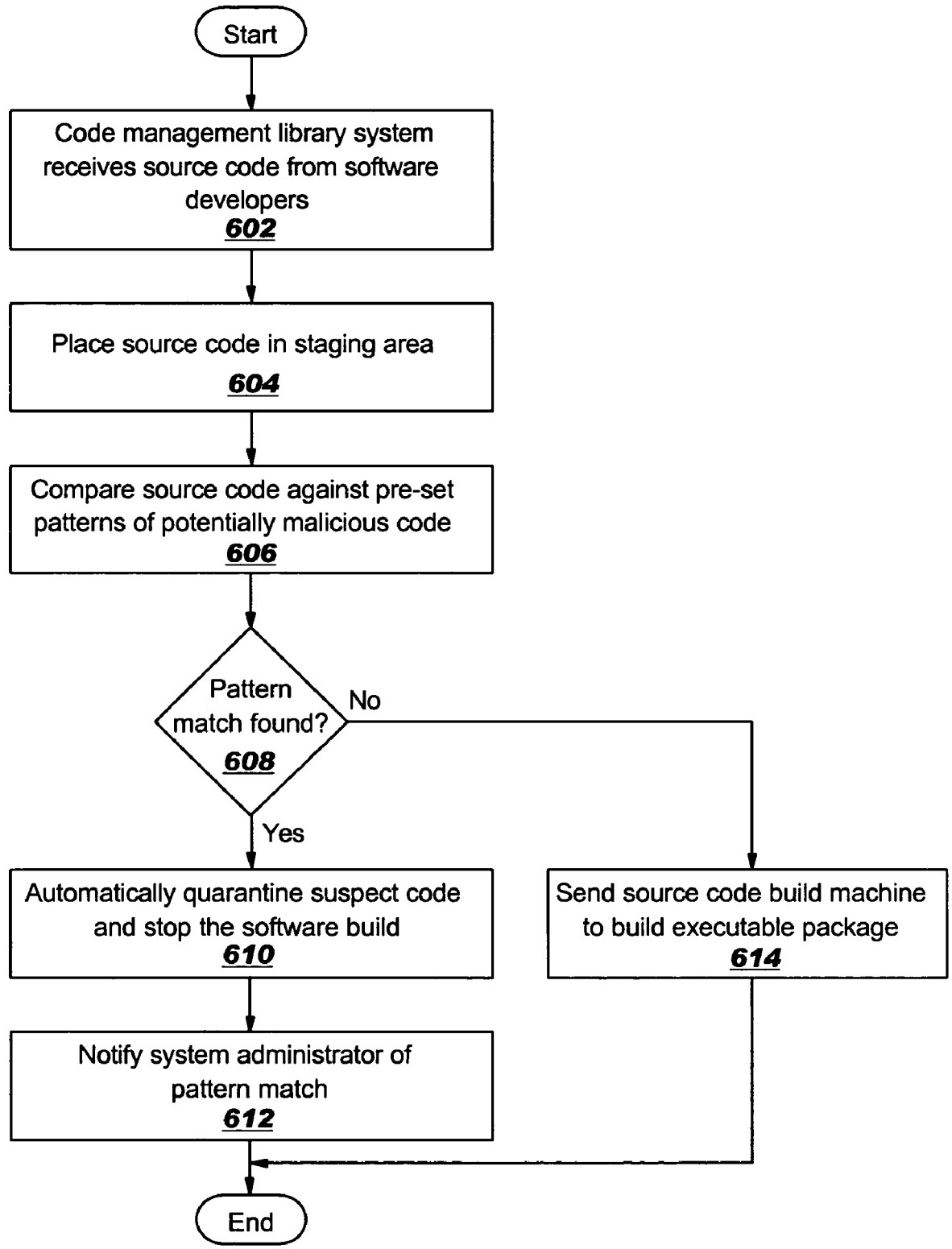
FIG. 6 is a flowchart of a process for enhancing source code management by using existing virus detection methods to identify potentially malicious code in the source code of a software product in accordance with a preferred embodiment of the present invention.

FIG. 6 is a flowchart of a process for enhancing source code management by using existing virus detection methods to identify potentially malicious code in the source code of a software product in accordance with a preferred embodiment of the present invention. The process described in FIG. 6 may be implemented in a data processing system, such as data processing system 300 in FIG. 3.

The process begins with a code management library system receiving source code from one of more software developers in a collaborative development environment (step 602). Various disconnected developers may provide source code to the code management software system. When the source code is received at the code management library system, the source code is placed in a staging area (step 604). The code management library system then performs a check of the source code against pre-set patterns of potentially malicious code (step 606). In a preferred embodiment, this comparison may be performed when either a network access to a hard-coded host, a file system access to "sensitive" files, or when a file system access to "system files" occurs.

A determination is then made as to whether a pattern match between known malicious code and the source code has been found (step 608). If the comparison results in a pattern match, the code management library system may automatically quarantine the suspect code and stop the software build (step 610). In addition, the code management library system may also notify the system administrator of the match (step 612).

Turning back to step 608, if the comparison does not result in a pattern match, the source code is sent to the build machine to build an executable package (step 614).

Figure 7:
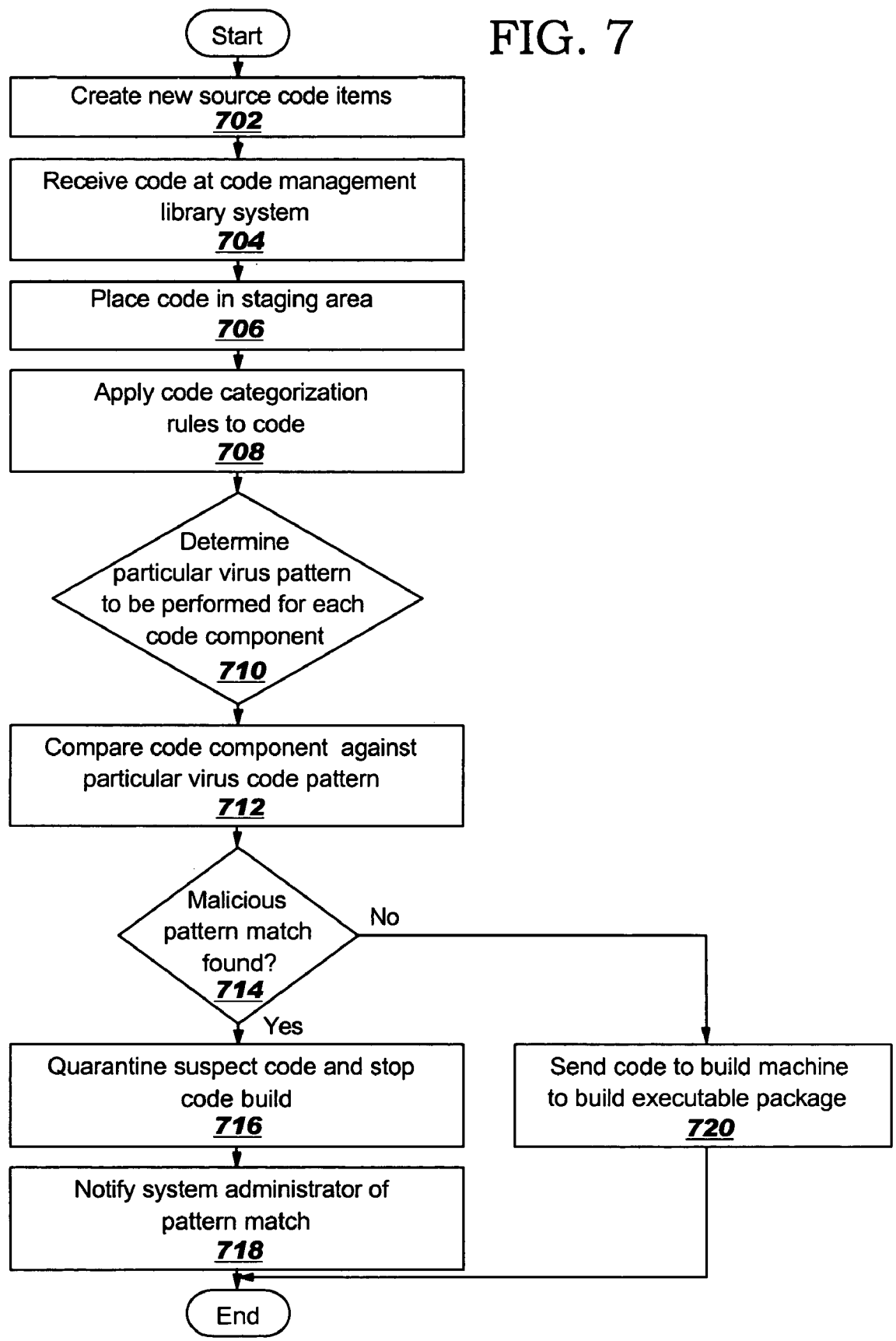
FIG. 7 is a flowchart of a process for customizing malicious code searches in accordance with a preferred embodiment of the present invention.

FIG. 7 is a flowchart of a process for customizing malicious code searches in accordance with a preferred embodiment of the present invention. Malicious code searches may be customized in order to limit the number of searches performed on the source code and improve the performance of the source code virus detection. The process described in FIG. 7 may be implemented in a code management library system, such as code management library system 500 in FIG. 5.

When the library is being set up to receive new code, the process begins with the library administrator or security administrator creating new source code items, such as new components, tracks, packages, releases, etc. (step 702). The security classification for each of the new items may be assigned at that time. The classifications may be based on the definitions associated with each library implementation, but in general are as described in FIG. 5 above. Once the classifications are established, the code management library system receives new source code written by a developer (step 704). The code may be checked into a particular library component that is classified with the security level for the particular source code.

When all source code changes have been checked in and are ready for a build, the code is placed in a staging area (step 706). In the staging area, classification rules are applied to the code (step 708) in order to identify how components of the code are to be checked for viruses. A decision is then made as to which particular virus pattern check is to be performed on each code component according to the code classification rules (step 710). For example, only certain components of the code may be checked for certain virus patterns, while other code components are checked for other patterns. In this manner, a large part of the code may not require virus checking at all, since most of the code may not touch sensitive areas.

Once the virus pattern check to be performed for the code components have been identified, steps 712-720 of the process in FIG. 7 may be performed in a manner similar to the virus detection method described in steps 606-614 in FIG. 6.

Figure 8:
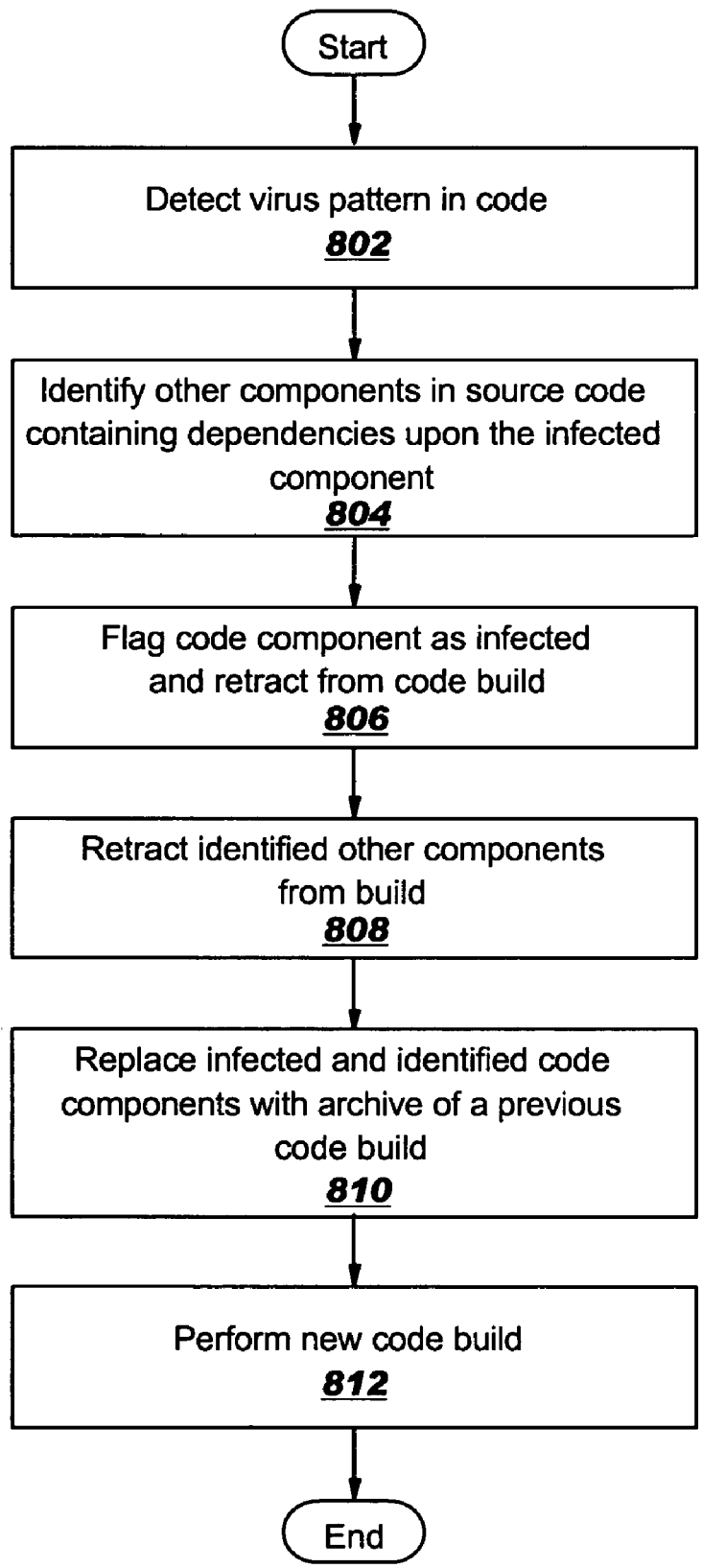
FIG. 8 is a flowchart of a process for autonomically repairing a code build in accordance with a preferred embodiment of the present invention.

FIG. 8 is a flowchart of a process for autonomically repairing a code build in accordance with a preferred embodiment of the present invention. The repair mechanism of the present invention may be implemented as an extension to code management library system 500 in FIG. 5. The repair mechanism of the present invention allows for repairing infected build code by reverting to a previous archive of the code. The repair mechanism may autonomically rollback to a previous build regardless of where the offending code is located, or obtain the previous file containing the offending code from a configuration management tool and then rebuild the entire code.

The process begins with detecting a virus pattern within a code component (step 802). When a virus pattern is found, a determination is made as to whether there are other components in the source code that contain dependencies upon the infected component (step 804). This determination may be made by checking the rules defining the relationships of the code components. For example, a set of classes may exist for each change set representing a build. Specific components of the source code may fall into one of the classes. The relationship between the components may be defined as rules that declare dependencies between these components.

When infected code is detected, that code component is flagged as infected, and may be retracted from the build (step 806). In addition, based on the dependencies for that infected component, other components in the code may also be retracted (step 808). Thus, the repair mechanism of the present invention allows for only retracting an infected code component from the build, as well as retracting any other code component that has dependencies upon infected code.

The identified code components may then be replaced with an archive of a previous code build (step 810). The entire source code (including any code not infected) may be replaced with a previous version of the build, or, alternatively, only those identified code components may be replaced with previous versions of the components. A new code build of the source code may then be performed using components obtained from previous code builds (step 812).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system that autonomically repairs malicious source code prior to executing a software product build, the method comprising:

a processor receiving a plurality of source code contributions at a source code management library system, each of the plurality of source code contributions including source code for the software product build, and wherein the plurality of source code contributions are developed remotely by a plurality of software developers in a collaborative development environment;

responsive to receiving the plurality of source code contributions from the plurality of software developers in the collaborative development environment, moving each of the plurality of source code contributions to a staging area in the source code management library system;

prior to executing the software product build, determining whether a source code contribution in the plurality of source code contributions in the staging area contains code that is malicious, wherein the determining of whether a source code contribution contains malicious code comprises comparing the source code contribution against a pre-set pattern of code that is potentially malicious;

responsive to detecting malicious code in at least one of the source code contributions, identifying other source code contributions having a dependency on each of the at least one source code contribution containing malicious code;

performing a rollback to a previous version of the at least one source code contribution containing malicious code and each source code contribution having a dependency to repair the software product build, wherein said rollback occurs before forwarding the plurality of source code contributions from the staging area, and wherein after said rollback the source code contributions containing malicious code have been removed from the staging area; and when proceeding with said software build, utilizing said previous version of said source code contributions in the staging area instead of source code contributions determined to contain malicious code.

2. The method of claim 1, further comprising:
responsive to the determination that malicious code exists in at least one of the source code contributions, notifying a trusted authority of the malicious code in the source code contribution in the staging area.

3. The method of claim 1, further comprising:
responsive to a determination that malicious code does not exist, forwarding the plurality of source code contributions for integration into the software product build; and
performing the software product build with the source code contributions.

4. The method of claim 1, wherein the determining whether a source code contribution contains malicious code comprises comparing the source code contribution against a pre-set pattern of textually represented, non-compiled code that is potentially malicious.

5. The method of claim 1, further comprising identifying a malicious code pattern in the source code contribution in the staging area based on the comparing.

6. A method of preventing malicious code from entering a software product build in a collaborative software development environment, comprising:
a processor receiving a plurality of source code contributions at a staging area of a source code management library system;
checking each of the plurality of source code contributions for malicious code at the staging area, the checking performed by a detection engine of the source code management library system, wherein the checking comprises comparing the source code contribution against a pre-set pattern of code that is potentially malicious;

responsive to detecting malicious code in at least one of the source code contributions, identifying other source code contributions having a dependency on each of the at least one source code contribution containing malicious code;

performing a rollback to a previous version of the at least one source code contribution containing malicious code and each source code contribution having a dependency to repair the software product build;

replacing the source code contribution of said staging area with said rollbacked previous version of the source code contribution;

replacing each source code contribution having a dependency on the source code contribution containing malicious code in the staging area with a rollbacked previous version of that source code contribution;

when proceeding with said software build, utilizing said replaced source code contributions of the staging area instead of source code contributions determined to contain malicious code and instead of source code contributions dependent upon source code contributions containing malicious code.

7. A method of preventing malicious code from entering a software product build in a collaborative software development environment, comprising:
a processor receiving a plurality of source code contributions at a staging area of a source code management library system;
checking each of the plurality of source code contributions for malicious code at the staging area, the checking performed by a detection engine of the source code management library system, wherein the checking comprises comparing the source code contribution against a pre-set pattern of code that is potentially malicious;
upon determining that one of the source code contributions contains malicious code, identifying other source code contributions having a dependency on each of the at least one source code contribution containing malicious code;
performing a rollback to a previous version of the at least one source code contribution containing malicious code and each source code contribution having a dependency to repair the software product build, wherein said rollback occurs before forwarding the plurality of source code contributions from the staging area, and wherein after said rollback the source code contributions containing malicious code have been removed from the staging area; and
when proceeding with said software build, utilizing said previous version of said source code contributions in the staging area instead of source code contributions determined to contain malicious code.

8. The method of claim 7, further comprising:
proceeding with the software product build using the source code contributions of the staging area to produce an executable software product.

9. The method of claim 6, further comprising:
responsive to a determination that malicious code does not exist, forwarding the plurality of source code contributions for integration into the software product build; and
performing the software product build with the source code contributions.

10. The method of claim 6, wherein the checking is performed when there is one of a network access to a hard-coded host, a file system access to sensitive files, and a file system access to system files.

11. The method of claim 6, wherein the checking is selectively applied to the plurality of source code contributions according to code classification rules.

12. The method of claim 7, wherein the checking comprises comparing the source code contribution against a pre-set pattern of code that is potentially malicious.

13. The method of claim 12, wherein the checking is performed when there is one of a network access to a hard-coded host, a file system access to sensitive files, and a file system access to system files.

14. A code management library system for autonomically detecting malicious source code prior to executing a software product build, comprising:

a staging area, wherein the staging area comprises a storage medium that holds source code received from a plurality of software developers in a collaborative development environment;

a build machine comprising a computer program product stored in a storage medium for performing a software product build; and a detection engine comprising a computer program product stored in a storage medium, wherein the detection engine is configured to:

prior to executing a software product build by executing the build machine, determine whether a source code contribution in the plurality of source code contributions in the staging area contains code that is malicious, wherein the determining of whether a source code contribution contains malicious code comprises comparing the source code contribution against a pre-set pattern of code that is potentially malicious;

responsive to detecting malicious code in at least one of the source code contributions, identifying other source code contributions having a dependency on each of the at least one source code contribution containing malicious code; and responsive to a determination that malicious code exists in at least one of the source code contributions, performing a rollback to a previous version of the at least one source code contribution containing malicious code and each source code contribution having a dependency to repair the software product build, wherein said rollback occurs before forwarding the plurality of source code contributions from the staging area, and wherein after said rollback the source code contributions containing malicious code have been removed from the staging area.

15. The code management library system of claim 14, wherein the detection engine further notifies a system administrator of the malicious code in response to determining that malicious code exists.

16. The code management library system of claim 14, wherein the detection engine sends the source code to the build machine to execute the software product build in response to determining that malicious code does not exist.

17. The code management library system of claim 14, wherein removing the source code from the software product build includes placing the source code in quarantine.

18. The code management library system of claim 14, wherein the detection engine determines whether malicious code exists in the source code using one of malicious code pattern matching and malicious code pattern identification.

19. The code management library system of claim 14, wherein the detection engine determines malicious code exists in the source code when one of a network access to a hard-coded host, a file system access to a sensitive file, and a file system access to a system file occurs.

20. The code management library system of claim 19, wherein malicious code pattern matching is used to compare the source code against pre-set patterns of malicious code.

* * * * *